United States Patent [19]

Wu et al.

[11] Patent Number: 5,020,007

[45] Date of Patent: May 28, 1991

[54] METHOD FOR MONITORING THE HEALTH OF PHYSICAL SYSTEMS PRODUCING WASTE HEAT

[76] Inventors: Samuel C. Wu, 10205 W. Exposition Ave., Lakewood, Colo. 80226; Charles E. Brossia, 1748 E. Ross La., Highlands Ranch, Colo. 80126

[21] Appl. No.: 166,180

[22] Filed: Mar. 10, 1988

[51] Int. Cl.$^5$ ................. G06F 15/20; G01K 13/00
[52] U.S. Cl. .................. 364/551.01; 364/571.03; 364/570; 374/137; 374/144; 374/145; 73/116
[58] Field of Search ............ 364/551.01, 571.03, 364/571.07, 557, 553, 570, 571.02, 571.04; 374/45, 144, 145, 137, 121; 73/116, 117.3

[56] References Cited

U.S. PATENT DOCUMENTS

| | | | |
|---|---|---|---|
| 3,357,239 | 12/1967 | Hohenberg | 73/116 |
| 3,499,323 | 3/1970 | Sturges | 73/116 |
| 3,931,619 | 1/1976 | Moore et al. | 73/116 |
| 4,046,002 | 9/1977 | Murphy et al. | 73/116 |
| 4,122,720 | 10/1978 | Podl | 374/144 |
| 4,510,576 | 4/1985 | MacArthur et al. | 73/112 |
| 4,665,485 | 5/1987 | Lundy et al. | 364/551.01 |
| 4,707,796 | 11/1987 | Calabro et al. | 364/551.01 |
| 4,719,587 | 1/1988 | Berte | 364/551.01 |

*Primary Examiner*—Parshotam S. Lall
*Assistant Examiner*—V. Trans
*Attorney, Agent, or Firm*—Timothy J. Martin

[57] ABSTRACT

A method for monitoring the health of a physical system that produces waste heat as a function of ambient temperature includes the generation of a standard profile model of the system in good health and a degraded profile model of the system in bad health, each profile being within the same family of curves. The monitored system is then sampled for sample ambient temperature and sample waste heat temperature to generate a system degradation indicator, preferably as a percentage of degradation. Alarms and displays present relevant warnings and information to the user. Waste heat affecting variables in addition to ambient temperature may be included in the standard and degraded profiles, and these variables may be monitored to produce the degradation indicator. The method is preferably microprocessor controlled.

20 Claims, 4 Drawing Sheets

METHOD FOR MONITORING THE HEALTH OF PHYSICAL SYSTEMS PRODUCING WASTE HEAT

FIELD OF THE INVENTION

The present invention generally concerns the operative performance of physical systems and specifically concerns monitoring the performance of a physical system in order to evaluate severity of degradation of such physical system from a healthy state. Accordingly, the present invention is directed to a method of evaluating the degradation of a physical system which produces waste heat during its operation and exhausts the waste heat into its ambient environment. This method also allows prediction of the temperature of the ambient environment at which the system will fail.

BACKGROUND OF THE INVENTION

There has a been a long felt need for a monitoring method and system for evaluating the health of a physical system during its operation. Such systems include combustion engines and their associated cooling systems, electrical motors, transmissions, differentials, gear boxes, pumps, compressors, electronic equipment, superconductors, to name a few. It is heretofore been difficult to evaluate the health of such physical systems during operation and to warn the user of a degraded state of health which might lead to impending breakdown and failure of the physical system.

The value of a method which provides an indication of physical system health as a forecast to failure can be unquestioned. Not only can the direct benefits of preventive maintenance be realized, but also the costly and sometimes disastrous consequential damages from failure of a physical system be avoided. For example, with respect to engine driven vehicles, the direct costs from failure of the combustion engine include those incurred in the rebuilding or the repair of the engine while the indirect costs include loss of vehicle availability and readiness, decreased operational efficiencies, shortened vehicle service life, increased costs of maintenance materials, loss of man power and delays. Delays in vehicle availability can, in turn, result in a loss of perishable goods where the vehicle is being used for delivery and can result in construction delays where construction vehicles are involved.

It has been found in those physical systems which produce and exhaust heat (through cooling systems or by direct radiation), that a precursor to failure of such physical systems is either an increase in the waste heat generated by the physical system or a decrease in ability to reject heat into the environment. It should therefore be appreciated that, for the physical systems subject of the present invention, at least some waste heat is produced during operation. The ability of these systems to exhaust waste heat to the ambient environment depends on the temperature of the ambient environment.

Variables other than ambient temperatures may also affect the production of waste heat of the physical system that is to be rejected into the environment. These variables are usually dependent upon the physical system involved. One such variable, for example, is the load placed upon the physical system; this load, in turn, may be expressed as other variables. This load contributes significantly to the waste heat produced thereby. Engines, electrical motors, gear boxes, transmissions, and the like produce waste heat directly in response to load based upon their relative energy efficiencies.

Some physical systems, however, are fairly independent of load. For example, the cooling system of an engine, as a separate physical system from the engine itself, may exhibit a normal capacity for cooling even a degraded engine so that the degraded engine does not fail. However, should the cooling system be degraded, it may allow overheating and failure of the engine even though the engine was previously in good health.

Existing techniques of monitoring physical systems measure, display and generate alarms of one measurement, such as heat. For example, most motor vehicles are equipped with either a temperature gauge or a temperature warning light that responds to coolant temperature to display that temperature or, in the case of a warning light, a warning of an excessive temperature condition is indicated. Such systems do not take into account the ambient temperature of the vehicle's environment. These techniques have not proved suitable for accurately determining the health of the physical system since there is a plurality of variables associated with these systems.

Further, with respect to coolant systems, other warning systems to signal high coolant temperatures have been developed, and some coolant monitors also indicate corrosion and electrically conductive contaminants in the coolant. U.S. Pat. No. 3,475,750 discloses a temperature monitoring system which uses several analog temperature sensors in order to provide a display of operating conditions of an engine. Similar heat sensors are known to disconnect a power supply to an electrical motor should the motor overheat or draw excess current. Likewise, many devices are protected by fuses or circuit breakers which respond to disconnect the device from its power supply when the device is overheated or drawing excessive electrical current.

None of the systems or devices used in the prior art, however, are known to provide a method or apparatus to measure the degradation of a system or to provide a forecast for potential failure of the physical system or to predict an ambient failure temperature for a degraded system. Accordingly, there remains a need for such a method and apparatus.

SUMMARY OF THE INVENTION

It is an object of the present invention to provide a method for monitoring the health of a physical system which produces waste heat as a function of ambient temperature in order to obtain the degradation of the physical system's health when compared to a standardized model of a physical system in known good health.

It is another object of the present invention to provide a method for measuring the overall health of a physical system against a baseline profile of a standardized model of the system in order to incorporate in the degradation measurement method the measurable heat-affecting parameters affecting the physical system.

A further object of the present invention is to provide a method which automatically monitors waste heat temperature and ambient temperature and which either provides a display of those temperatures, otherwise indicates a warning condition based on those temperatures and/or displays an indicator representing the health of the physical system compared to a baseline profile of a model physical system in good health.

Another object of the present invention is to provide a method for measuring the health of a physical system as a percentage of degradation between a standardized model and a fully degraded model of the system.

A still further object of the present invention is to provide a method of monitoring the health of a physical system as a function of ambient temperatures and other waste heat affecting variables.

According to the teachings of the present invention a broad method of maintaining the health of a physical system is described wherein the physical system is of the type that produces waste heat at a waste heat temperature $T_B$ as a function of ambient temperature $T_A$ and discharges such waste heat into its ambient environment. This method of monitoring the health of the monitored physical system generates a degradation indicator of the monitored physical system's health compared with a standardized model of the physical system in good health. In such system, the physical system has a maximum rated operating temperature $T_{MR}$ and a failure temperature $T_F$ at which the physical system fails. This method broadly comprises the steps of first measuring the waste heat temperature discharged by the standardized model as a function of ambient temperature and developing therefrom a standard baseline profile $S(T_A)$ of the standardized model representing the physical system in good health. This standardized baseline profile is stored in a memory means for retaining information suitable for later retrieval. After development of the standard baseline profile, the method includes the step of monitoring the ambient temperature of the monitored physical system to obtain a sample ambient temperature $T_{AS}$ at a sample time, and measuring the temperature of the waste heat of the monitored physical system at the sample time to obtain a sample waste heat temperature $T_{BS}$. An expected waste heat temperature $S(T_{AS})$ is then generated from the measured sampled ambient temperature applied to the standard baseline profile stored in the memory means. Finally, a proportionalized degradation indicator is generated when the degradation indicator represents the health of the monitored physical system. This degradation indicator is generated by comparing the sample with the sample waste heat temperature $T_{BS}$ to the expected waste heat temperature $S(T_{AS})$ at the sample ambient temperature $T_{AS}$.

In the preferred form of the present invention, the sampling of the ambient temperature and the waste heat temperature is periodically updated to generate a periodically updated degradation indicator. Preferably, this occurs once every second. Furthermore, according to the preferred embodiment of the present invention, the measurement of temperatures are accomplished by electrical sensors readable by a microprocessor and the degradation indicator automatically calculated. Preferably, the degradation indicator is generated as a percentage between a reference degraded system and a standard profile. To this end, a degradation profile $D(T_A)$ for a sample physical system having a reference degree of degradation is produced as a curve in the same family of curves as the standard profile. The degradation indicator percentage is thus the expected waste heat temperature minus the measured waste heat temperature, the quantity of which is then divided by the expected degraded waste heat temperature of the degradation model minus the expected temperature of the standard model all of which is multiplied by 100%. Conveniently, the degradation profile for a fully degraded system may be selected to be that curve within the family of curves which contains the point $(T_{MR}, T_F)$ at which the system fails at the rated maximum operating temperature.

Further, the preferred embodiment of the present invention includes the steps of inhibiting the calculation of the degradation indicator of the monitored system until the waste heat temperature exceeds a threshold temperature. The step of displaying the degradation indicator in a visually perceivable manner, the step of displaying the temperature of the sample waste heat temperature until it equals or exceeds a preselected waste heat threshold value, the step of producing an audible alarm when the degradation indicator equals or exceeds a preselected first alarm value and the step of producing a visually perceivable warning when the degradation indicator is equal to or exceeds a preselected second alarm threshold value are also contemplated within the scope of this invention. An excess temperature alarm may also be produced when the sample waste heat temperature equals or exceeds a preselected maximum temperature value. The baseline profile as well as the degraded profile may be stored in memory for the microprocessor either as an algorithm or as a data array. Where the data is stored in an array, the microprocessor is provided with means for interpolating the data for the waste heat affected variables. Finally, the data generated may be used to predict the expected ambient temperature at which the monitored system may fail.

These and other objects of the present invention will become more readily appreciated and understood from a consideration of the following detailed description of the preferred embodiment when taken together with the accompanying drawings, in which:

DETAILED DESCRIPTION OF THE PREFERRED EMBODIMENT

The present invention is directed to a method for monitoring the health of a physical system that produces waste heat as a function of ambient temperature which affects the ability of the physical system to exhaust or discharge the waste heat into its ambient environment. The method also includes the possibility that waste heat produced by the physical system is a function of additional variables. The method for monitoring the health of such system is directed to obtaining the degradation of the physical system's health with reference to a standardized model of the physical system in good health as calibrated for the specific physical system. Thus, while the present invention is described, for purposes of example, with reference to an engine's cooling system, with reference to an electronic component and with reference to a gear box, it should be appreciated that a wide variety of physical systems may be monitored according to the method and apparatus of the present invention.

Generally, it is contemplated that the present invention may be implemented with virtually any physical system whose health is a function of temperature where such temperature is adapted to be exhausted into the environment. Particularly, and without limitation, potential applications of the present invention include the transmission systems of land vehicles, the transmissions of air vehicles, gear trains of marine vehicles, industrial gear boxes, electric motors, audio amplifiers, pumps, compressors, superconductors, and virtually any other electronic or mechanical equipment which operates under a load or generates heat. Thus, while this application is described to the specific systems shown in the Figures, it should be readily understood by the ordinarily skilled person versed in equipment performance monitoring, that the present invention may be implemented with a variety of physical systems.

Figure 6:
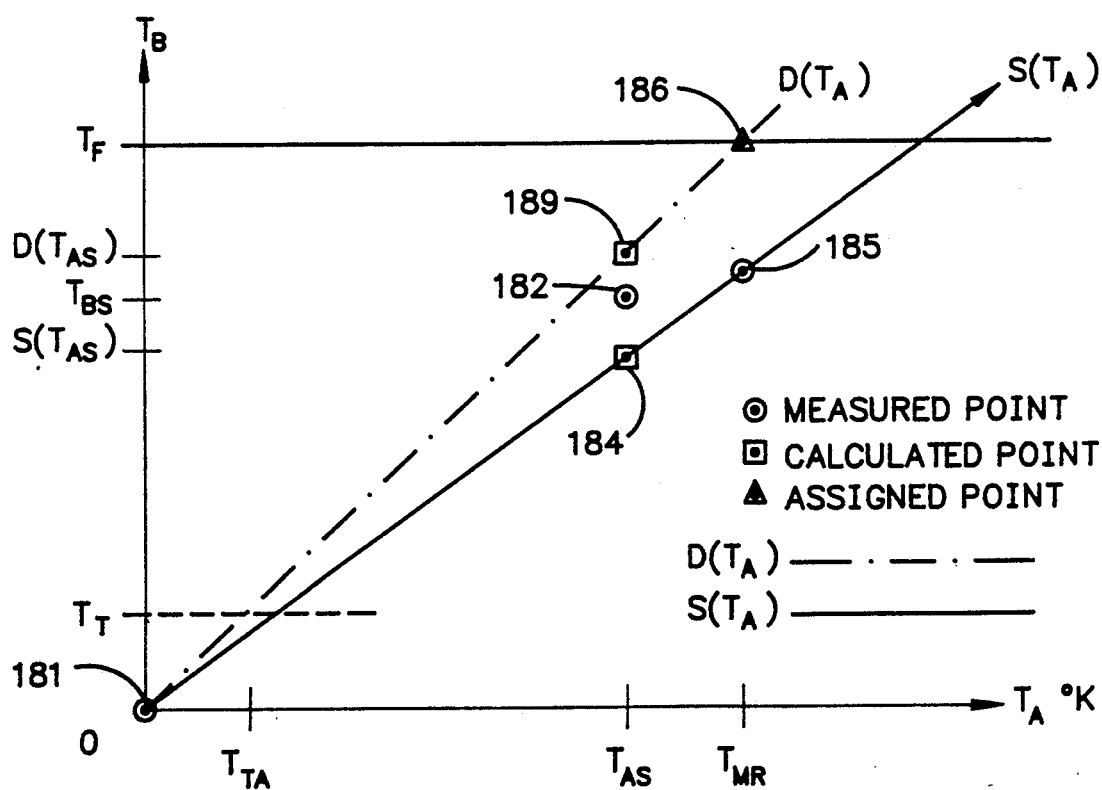
FIG. 6 shows a graph, similar to FIG. 2, showing the development of the standard baseline profile and degradation profile of the system shown in FIG. 5.

For purposes of the description of this invention, it is helpful to first define certain symbols that are used throughout this application. Accordingly, Table 1, below, sets forth a definition of symbolic terms for purposes of this description as well as reviewing FIGS. 2 and 6, as follows:

TABLE I $S(T_A)$ = Standard Baseline Profile
$D(T_A)$ = Standard Degradation Profile
$X(T_A)$ = Monitored System Profile
$D_S$ = Calculated Degradation for a sample measurement
$D_A$ = First threshold degradation for audio alarm
$D_V$ = Second threshold degradation for visual alarm
$T_A$ = Ambient temperature
$T_B$ = Waste heat temperature
$T_{MR}$ = Maximum rated ambient operating temperature of the physical system
$T_F$ = Failure temperature of the physical system
$T_{AS}$ = Ambient temperature observed during sampling of monitored system
$T_{BS}$ = Waste heat temperature observed during sampling of monitored system at $T_{AS}$
$T_{AF}$ = Ambient temperature at which monitored system is expected to fail
$T_{TA}$ = Threshold operating ambient temperature
$T_{BM}$ = Maximum acceptable waste heat temperature
$T_i$ = Heat affecting variables (e.g. load) other than ambient temperature.

Figure 1:
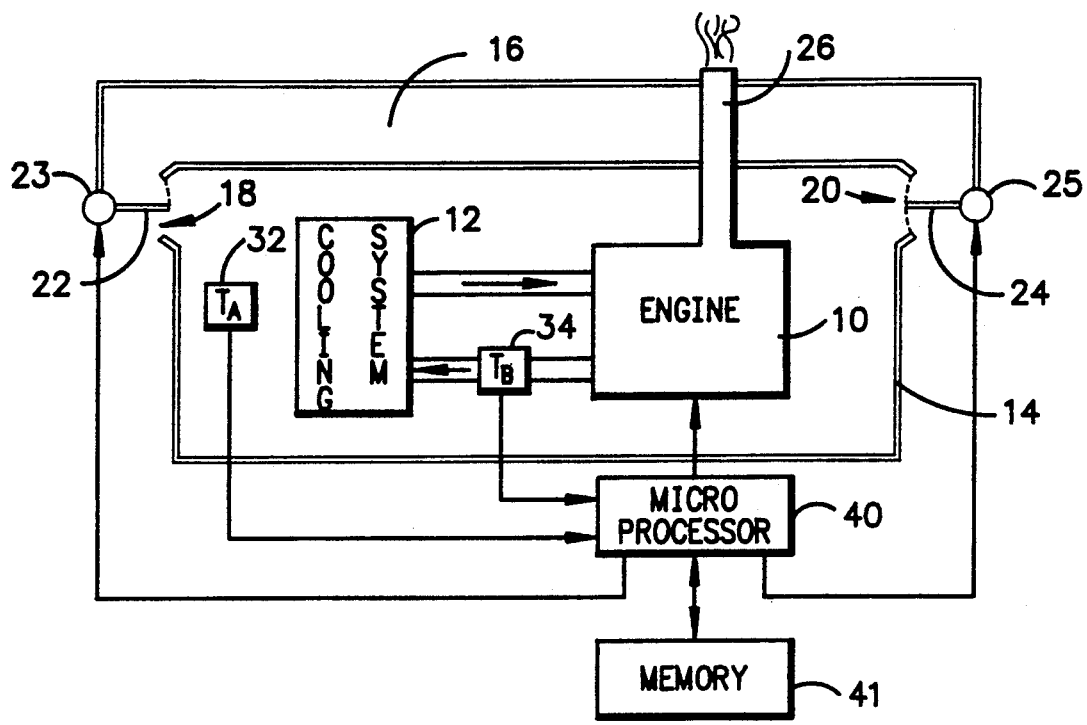
FIG. 1 is a diagram showing the system for developing a standard baseline profile for a representative physical system in the form of a cooling system and engine, according to the preferred embodiment of the present invention.
Figure 3:
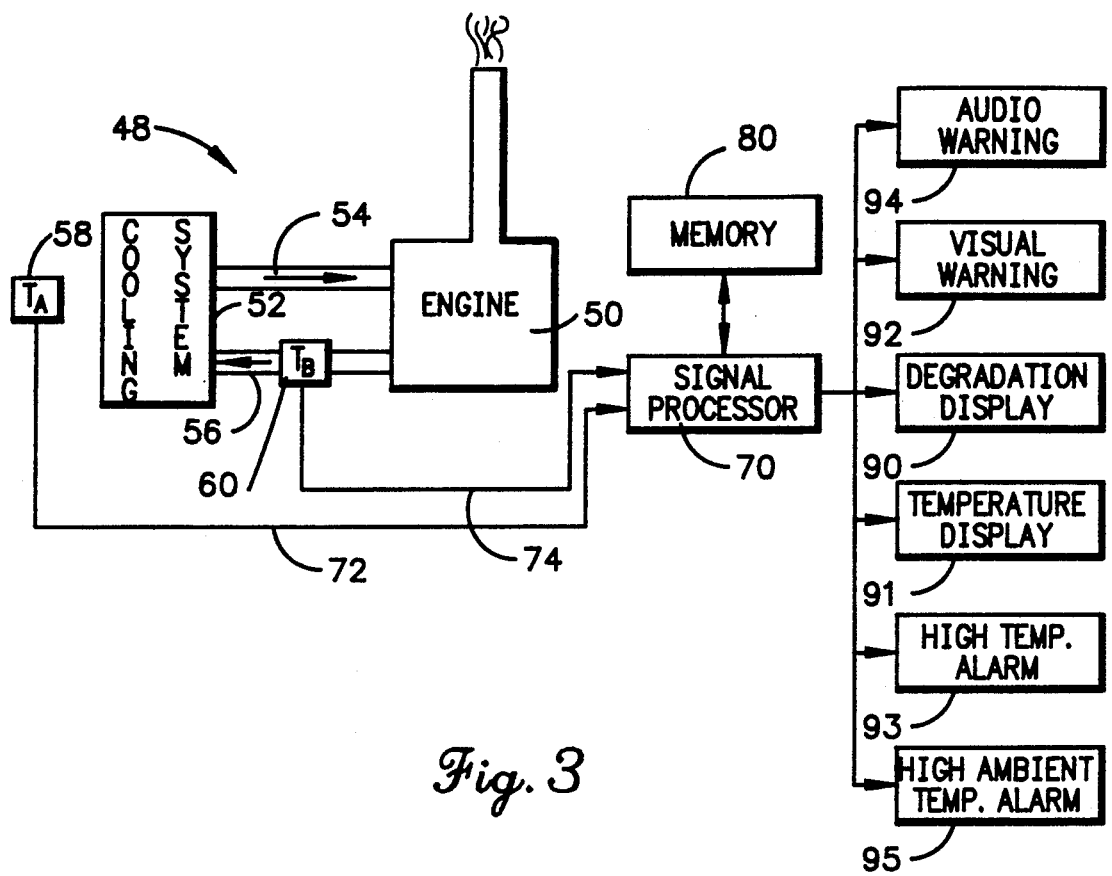
FIG. 3 is a diagram showing a monitored physical system, in the form of a cooling system of an engine, according to the method of the present invention.

The present invention, as noted, is directed to monitoring the health of any of a variety of physical systems. Thus, for a given physical system, it is first necessary to develop a standard baseline profile of the performance of that system represented by the ability of the system to discharge waste heat into the ambient temperature of the environment. An example of a selected physical system is shown in FIGS. 1 and 3, in diagrammatic form, as a traditional combustion engine and cooling system. Accordingly, in FIG. 1, a representative combustion engine 10 and cooling system 12 are located within an enclosure 14. A plenum 16 provides a source of heated air with enclosure 14 having a pair of ports 18 and 20 which communicate with plenum 16. Ports 18 and 20 may be variably regulated by baffles 22 and 24, respectively, so that a controlled amount of air may be circulated between plenum 16 and the interior of enclosure 14. Engine 10 has an exhaust 26 which operates to heat air in plenum 16. Thus, it should be appreciated that, upon starting engine 10, the ambient temperature of the environment of cooling system 12 in engine 10 may be controlled by the heated air from plenum 16.

Cooling system 12 circulates a cooling fluid to engine 10. To this end, a first conduit 28 conveys fluid from cooling system 12 to engine 10, and a second conduit 30 returns this cooling fluid to cooling system 12. The temperature of the ambient environment $T_A$ is monitored by a first temperature sensor 32. The waste heat temperature $(T_B)$ of engine 10 corresponds to the temperature of the returning fluid from engine 10 and is thus monitored by a second temperature sensor 34. Temperature sensors 32 and 34 may be of any convenient type, well known in the art. Temperature sensors 32 and 34 are electrically connected to microprocessor 40 which may, if desired, be used to operate servo motors 23 and 25 which respectively control the position of baffles 22 and 24. Microprocessor 40 includes a memory 41 to store data, and microprocessor 40 may also electronically control the operation of engine 10 for purposes of developing a profile of this standardized physical system.

The purpose of the standardized physical system shown in FIG. 1 is to develop the standard baseline profile $S(T_A)$ for the system which represents the good health state of the system to be tested. Accordingly, engine 10 and cooling system 12 are operated at different ambient temperatures $T_A$ accomplished by regulating heated air flow through enclosure 14, and the corresponding waste heat temperature $T_B$ is measured for each measured ambient temperature $T_A$. Measurement of $T_B$ as a function of $T_A$ is performed over a range of ambient temperatures up to the maximum ambient temperature $T_{MR}$ for which the physical system is rated. The resulting measurements of $T_B$ as a function of $T_A$ may then be used to create an algorithm derived by an equation fit for the data points over the range of ambient temperatures. Alternately, the standard baseline profile $S(T_A)$ may be represented by an array of $T_B$ as a function of $T_A$.

Figure 2:
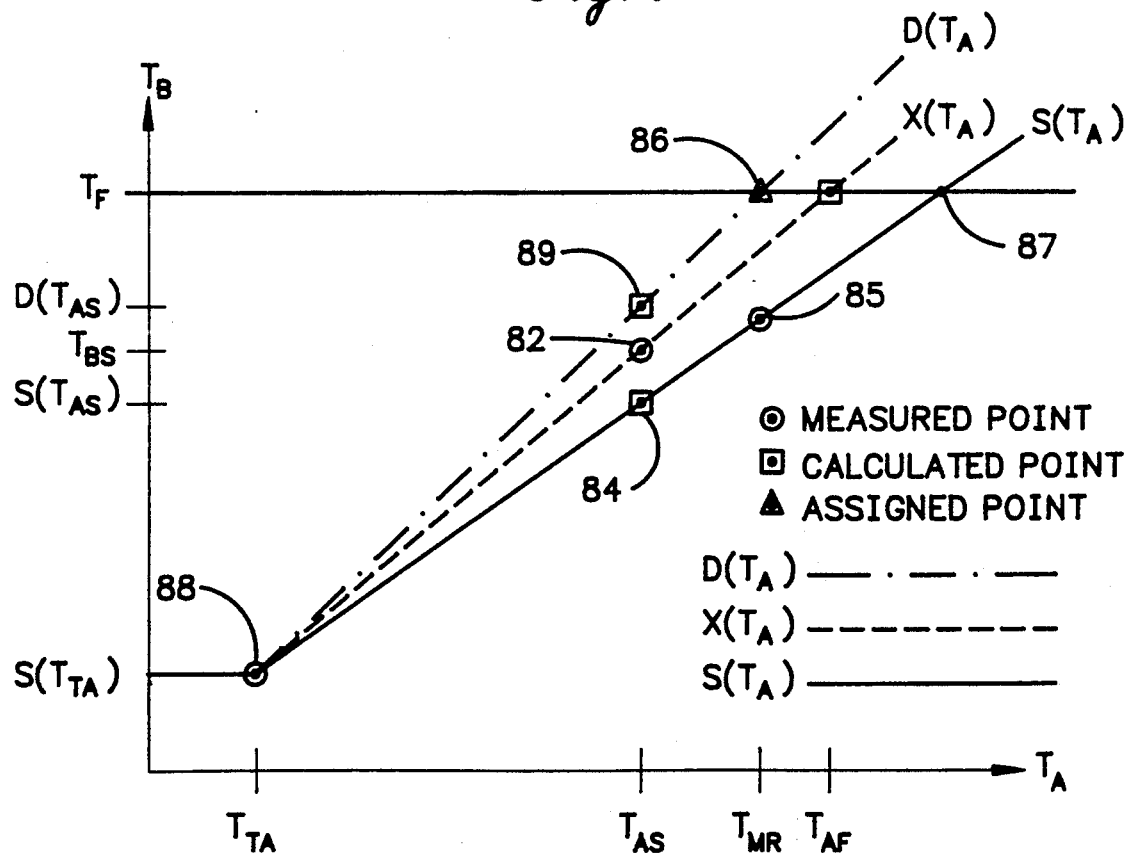
FIG. 2 is a graph showing the development of the standard baseline profile, a degradation profile and a monitored system profile according to the preferred method of the present invention.

With reference to FIG. 2, it is possible to plot the curve of the baseline profile $S(T_A)$ from a threshold operating temperature $T_{TA}$ at point 88 through the maximum rated operating temperature $T_{MR}$ at point 85 and even to extrapolate this graph to the failure temperature $T_F$, at point 87, of the physical system. $T_F$ corresponds to the waste heat temperature at which the physical system is expected to fail. For example, with respect to a coolant system, this could be the boiling temperature of the cooling fluid. For an engine, the failure temperature can be the temperature at which the engine lubricant fails. $S(T_A)$ is represented as a linear function since it has been experimentally found that such a linear function closely approximates the performance of the system shown in FIG. 1.

With reference to FIG. 3, it may be seen that a monitored physical system 48 may include an engine 50 and a cooling system 52. Cooling fluid flows from cooling system 52 to engine 50 through conduit 54 and returns to cooling system from engine 50 by means of conduit 56. Ambient temperature sensor 58 is provided to measure ambient temperature $T_A$ of the environment of monitored physical system 48 and waste heat temperature sensor 60 is provided to monitor waste heat temperature $T_B$ corresponding to the temperature of cooling fluid in conduit 56. Microprocessor 70 is electrically connected to temperature sensor 58 by means of wire 72, and is electrically connected to temperature sensor 60 by means of wire 74. Microprocessor 70 is provided with a memory 80 and a display 90 and is further connected to a visual warning device 92 and an audio warning device 94 respectively providing audio and visual warnings of conditions detected by microprocessor 70.

Microprocessor 70 monitors the ambient temperature $T_A$ and the waste heat temperature $T_B$ for the monitored physical system 48. Preferably, the step of sampling the monitored physical system is done on a periodic basis, preferably at intervals less than or equal to one second, so that samples of the ambient temperature and the waste heat temperature are continually updated.

With reference to FIG. 2, at a given sample time, a representative data point 82 may be noted which data point 82 corresponds to the sample ambient temperature $T_{AS}$ and the sample waste heat temperature $T_{BS}$ as quantitatively measured by sensors 58 and 60 at the selected sample time. A comparison of data point 82 with respect to the expected waste heat temperature $S(T_{AS})$ then gives an indicator of the degradation of the monitored system 48. This expected waste heat temperature $S(T_{AS})$ is derived from the standard baseline profile $S(T_A)$ evaluated at $T_{AS}$. This data point is represented at location 84 in FIG. 2.

Preferably, the degradation indicator is generated as a percentage calculation between the degradation of the monitored physical system and such physical system in a selected degraded state. While the ordinarily skilled person will recognize that the definition of a "degraded state" may be varied as desired, a convenient standard degradation profile $D(T_A)$ may be selected by defining a fully degraded system as one which fails at an ambient temperature equal to the maximum rated operating temperature of the physical system, $T_{MR}$. Thus, at location 86 in FIG. 2, such assigned data point is made, and $D(T_A)$ is the linear function containing the threshold waste heat temperature $S(T_{TA})$ for the threshold operating temperature $T_{TA}$. At this point, the standard baseline profile and the standard degradation profile are coincident since, at ambient temperatures less than $T_{TA}$, the system does not operate. It should now be appreciated that the graph shown in FIG. 2 represents the standard baseline profile $S(T_A)$, the standard degradation profile $D(T_A)$ as well as the monitored system profile $X(T_A)$ for the cooling system 52 and 12 of the selected physical system to be monitored. It should be readily apparent from the above description, that $X(T_A)$ is that linear function passing through data point 82 and the threshold operating data point 88 shown in FIG. 2.

The degradation indicator according to the preferred method of the present invention may now be represented as a percentage degradation wherein the amount of degradation of the monitored physical system is compared to the standard degradation profile as a percentage of degradation. Again with reference to FIG. 2, for the measured ambient temperature $T_{AS}$, the expected waste heat temperature $S(T_{AS})$ may be calculated as data point 84, and the degraded waste heat temperature $D(T_{AS})$ may be generated by solving the algorithm $D(T_A)$ for the sampled ambient temperature $T_{AS}$ as represented by data point 89. Where $D(T_A)$ is stored as an array of data points, data point 89 may be generated by interpolation, as is known in the art. From a determination of the three data points, $S(T_{AS})$, $T_{BS}$, and $D(T_{AS})$ it may readily be seen that the percentage of degradation may be calculated according to the formula:

$$\frac{T_{BS} - S(T_{AS})}{D(T_{AS}) - S(T_{AS})} \times 100\%$$

It should further be appreciated that, once the monitored system profile $X(T_A)$ is determined, it is possible to project the expected failure ambient temperature $T_{AF}$ at which the monitored system is expected to fail. This is accomplished by setting $X(T_A)$ equal to the failure temperature $T_F$ and either solving the determined algorithm, or extrapolating from one or more measured data points for sampled $T_{AS}$, to yield the ambient temperature $T_{AF}$ at which the system may fail. $T_{AF}$ may also be displayed by display 90. From the foregoing, it should also be appreciated that, should the monitored physical system perform better than the expected standard profile model $S(T_A)$ the calculated degradation indicator $D_S$ will be a negative percentage. Likewise, should the monitored physical system exhibit performance worse than the standard degraded profile, the degradation indicator $D_S$ will exceed 100%.

As noted above, it is desirable that the present method contemplates the measurement of the monitored physical system over a variety of ambient temperatures and is accomplished by periodically sampling the ambient temperature $T_A$ of the environment and the measured waste heat temperature $T_B$ of the system. This provides a highly useful method of measurement for the health of the physical system.

It should be appreciated that microprocessor 70 may be any convenient microprocessor monitoring device known in the art which can process the temperature signals by sensors 58 and 60 as well as process the data for the above-described calculations. One such microprocessor chip useful as microprocessor 70 is the Intel 8088 matched with appropriate support peripherals known in the art. Accordingly, microprocessor 70 is connected to a memory 80 which stores the data array or algorithm for the standard baseline profile and the standard degradation profile. Display 90 is provided to display the degradation indicator. Further, according to the preferred embodiment, a visual warning is generated by visual warning display 92 whenever the value of the degradation indicator $D_S$ exceeds one threshold visual warning value $D_V$ and an audio warning is generated by audio warning device 94 whenever the value of the degradation indicator $D_S$ exceeds an audio warning threshold value $D_A$. Display 91 is provided to display the waste heat temperature $T_{BS}$, the ambient temperature $T_{AS}$, or both. A high waste heat temperature warning, in the form of display or indicator 93 is provided to signal a warning whenever $T_{BS}$ exceeds $T_{BM}$, and a high ambient temperature display or indicator 95 is provided to warn that the sampled ambient temperature $T_{AS}$ exceeds the maximum stated temperature $T_{MR}$.

Figure 4:
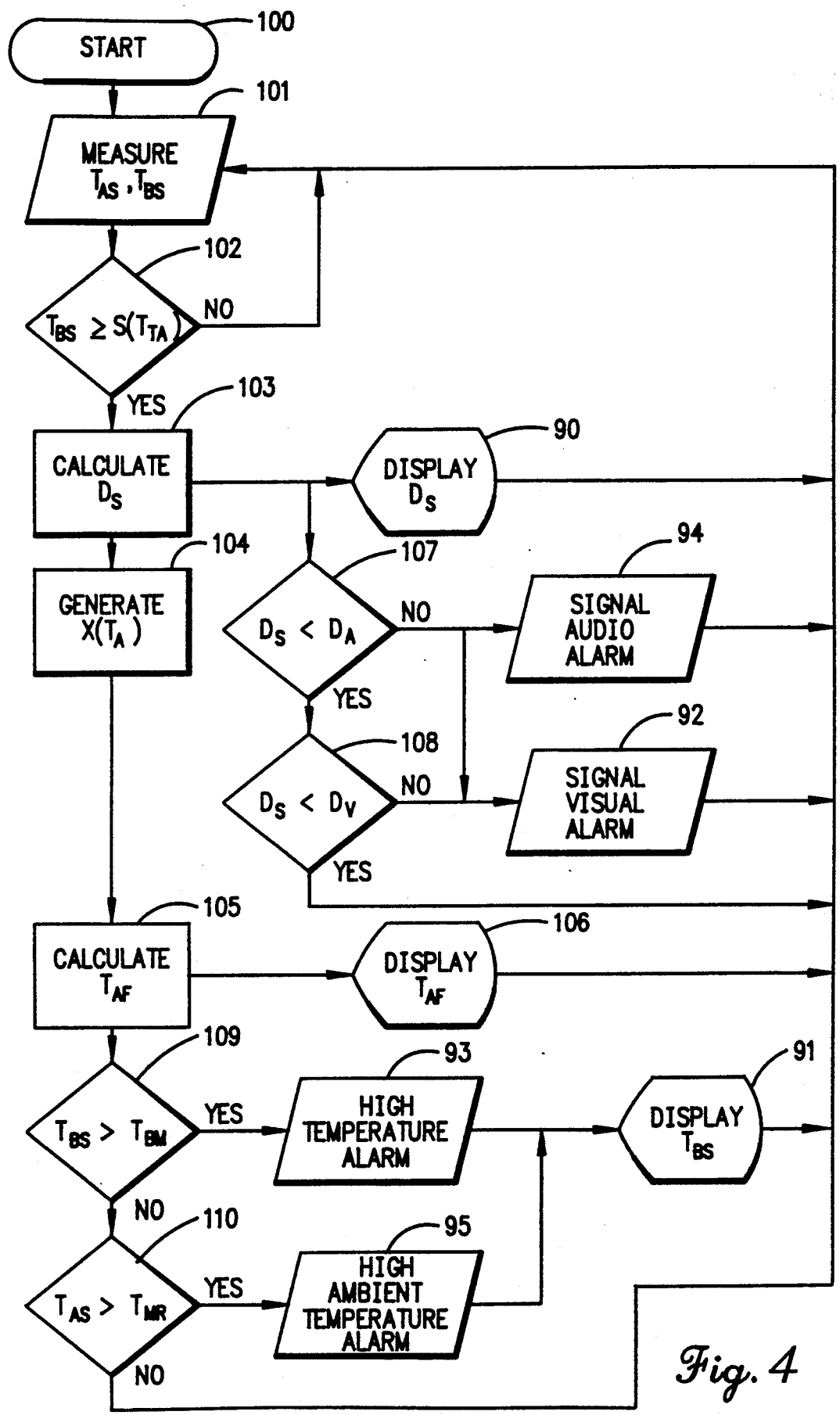
FIG. 4 is a method flow logic diagram showing the method steps according to the preferred embodiment of the present invention when used with the systems as shown in FIGS. 1-3.

The processing according to the preferred method as it relates to FIGS. 1-3 is shown in flow chart form in FIG. 4. Microprocessor 70 controls the processing, and it should be appreciated that the values for the various system constants, the standard profile and the degradation profile are all stored in memory 80. In FIG. 4, the monitoring process is started at location 100, and the sampling of $T_{AS}$ and $T_{BS}$ is initiated at 101 with measurement of $T_{AS}$ and $T_{BS}$ being accomplished by means of sensors 58 and 60 driven by signal processor 70. Preferably, signal, procesor 70 samples $T_{AS}$ $T_{BS}$ on a periodic basis at intervals of one second or less. Next, signal processor 70 compares the waste heat temperature $T_{BS}$ with the threshold waste heat temperature $S(T_{TA})$ at 102. In the event that the actual waste heat temperature $T_{BS}$ is less than $S(T_{TA})$, then the process repeats the measurement of $T_{AS}$ and $T_{AB}$ at the next cycle time. At such time that the measured waste heat temperature $T_{BS}$ equals or exceeds the threshold waste heat temperature $S(T_{TA})$, the degradation indicator $D_S$ is generated by the microprocessor, at 103. The generated $D_S$ is displayed by display 90.

Visual and/or audio alarms may be produced to warn of excessive degradation conditions. Here, $D_S$ is compared with a maximum accepted degradation $D_A$, at 107. Should the sample degradation $D_S$ be equal to or exceed the threshold degradation $D_A$, an audio alarm signals at 94, and a video alarm is signaled at 92. In the event that $D_S$ is less than $D_A$, $D_S$ is then compared with a second threshold alarm $D_V$ at 108. If $D_S$ is greater than or equal to $D_V$, the video alarm is signaled at 92. Should $D_S$ be less than $D_V$, the signal processing repeats.

If desired, the process according to the preferred embodiment of the present invention, as is shown in FIG. 4, may be further augmented by including a processing step for calculating the expected failure temperature of the system. Here, the algorithm $X(T_A)$ is generated at 104 from the two points $S(T_{TA})$ and the point $(T_{AS}, T_{BS})$ as that curve in the same family of curves as $S(T_A)$ and $D(T_A)$. Once this curve is generated, the expected failure ambient temperature may be generated by solving $X(T_A)$ wherein this curve intersects the line $T_B = T_F$, as is shown in FIG. 2. Thus, $X(T_{AF}) = T_F$ is solved for $T_{AF}$, at 105. This $T_{AF}$ may be displayed at 106.

It is also desirable to produce an alarm whenever the sampled waste heat temperature $T_{BS}$ exceeds a maximum acceptable waste heat $T_{BM}$ regardless of the degradation indicator. This is accomplished by comparing the sampled waste heat temperature $T_{BS}$ to the maximum allowed waste heat temperature $T_{BM}$, at 109, such that if $T_{BS}$ is greater than $T_{BM}$, a high temperature alarm is generated at alarm 93 and the waste heat temperature is displayed, as is shown at 91. Also, if desired, an alarm may be generated where the ambient temperature exceeds the maximum rated operative ambient temperature $T_{MR}$. This comparison is made at 110 and, where $T_{AS}$ exceeds $T_{MR}$, a high ambient temperature alarm is produced at 95.

Figure 5:
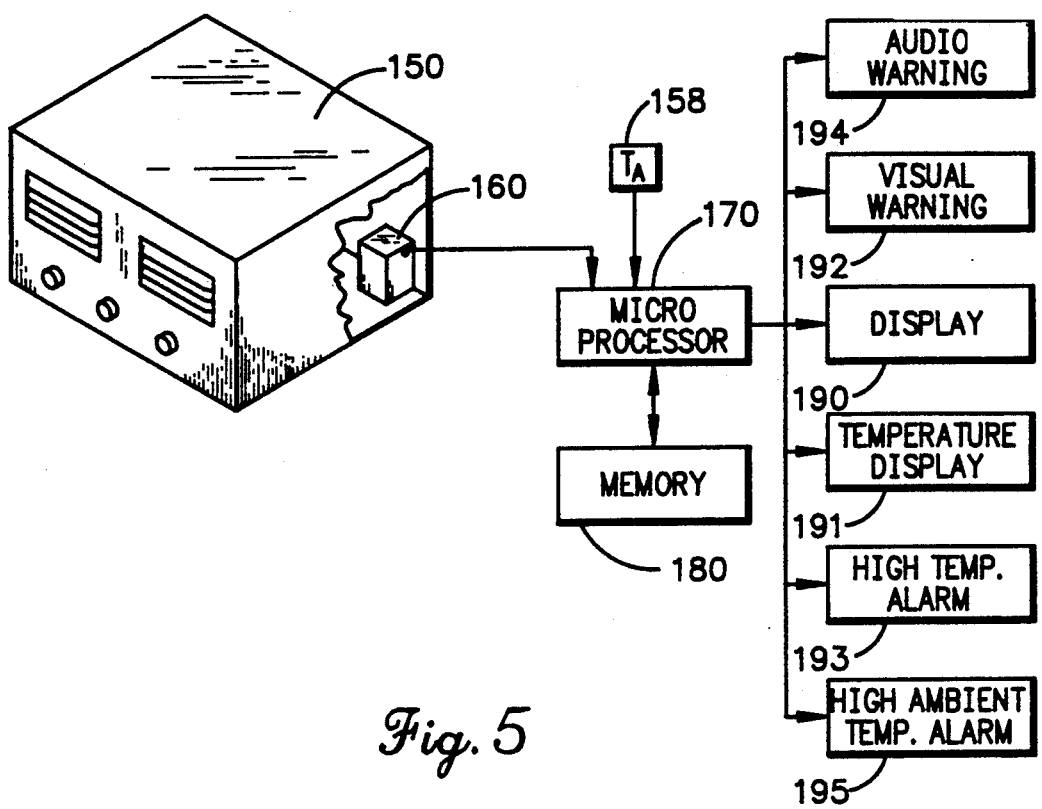
FIG. 5 is a diagram showing an electrical component, in perspective, implementing the preferred method according to the present invention.

As noted above, the present method may be used to monitor the health of physical systems other than that described with respect to FIGS. 1-3. A first such additional example is shown in FIG. 5 wherein the present process is used to monitor the health of an electrical appliance 150. Here, an ambient temperature sensor 158 is located at an external location to the housing of electrical apparatus 150 and a waste heat temperature sensor 160 is located within the housing. After the calibration and development of the standard baseline profile in a manner similar to that described with respect to FIGS. 1 and 3, above. Microprocessor 170 receives the temperature signals from sensors 158 and 160. The standard baseline profile as well as other desired temperature points is stored in memory 180. Microprocessor 170 is connected to a variety of displays and warnings, such as degradation display 190, temperature display 191, visual warning 192, high temperature alarm 193, audio warning 194 and high ambient temperature warning 195, similar to those shown in FIG. 3.

The standard baseline profile for the device shown in FIG. 5 may be accomplished by measuring an electrical apparatus in good health at a maximum rated operating temperature $T_{MR}$. This generates point 185 in FIG. 6 and, since this apparatus theoretically could operate at 0°K, the curve $S(T_A)$ passes through absolute zero as represented by point 181. It should be understood that $S(T_A)$ is represented as a linear curve in FIG. 6. This curve is not necessarily linear in actual practice but an acceptable curve may be developed from a plurality of actually measured data points, such as data point 185, after which the curve $S(T_A)$ is derived by a mathematical curve fitting operation, as is known in the art. The degradation curve $D(T_A)$ is then that curve which is in the same family of curves as $S(T_A)$ but passes through the data point $(T_{MR}, T_F)$. This data point is represented as point 186 in FIG. 6.

In the testing of the apparatus shown in FIG. 5, an actually measured point having coordinates $(T_{AS}, T_{BS})$ as represented by point 182, is sampled. From the measured $T_{AS}$, the expected waste heat temperature for a system in good health may be calculated by solving $S(T_{AS})$ for $T_{AS}$. This point is designated as $S(T_{AS})$ at point 184. Likewise, the fully degraded waste heat temperature for the corresponding measured ambient temperature may be obtained by solving $D(T_A)$ for the temperature $T_{AS}$. This results in point 189 corresponding to a waste heat temperature $D(T_{AS})$. A degradation indicator may then be generated as a percentage degradation according to the formula:

$$\frac{T_{BS} - S(T_{AS})}{D(T_{AS}) - S(T_{AS})} \times 100\% = D_S$$

These calculations could again be accomplished by the flowchart shown in FIG. 4.

Figure 7:
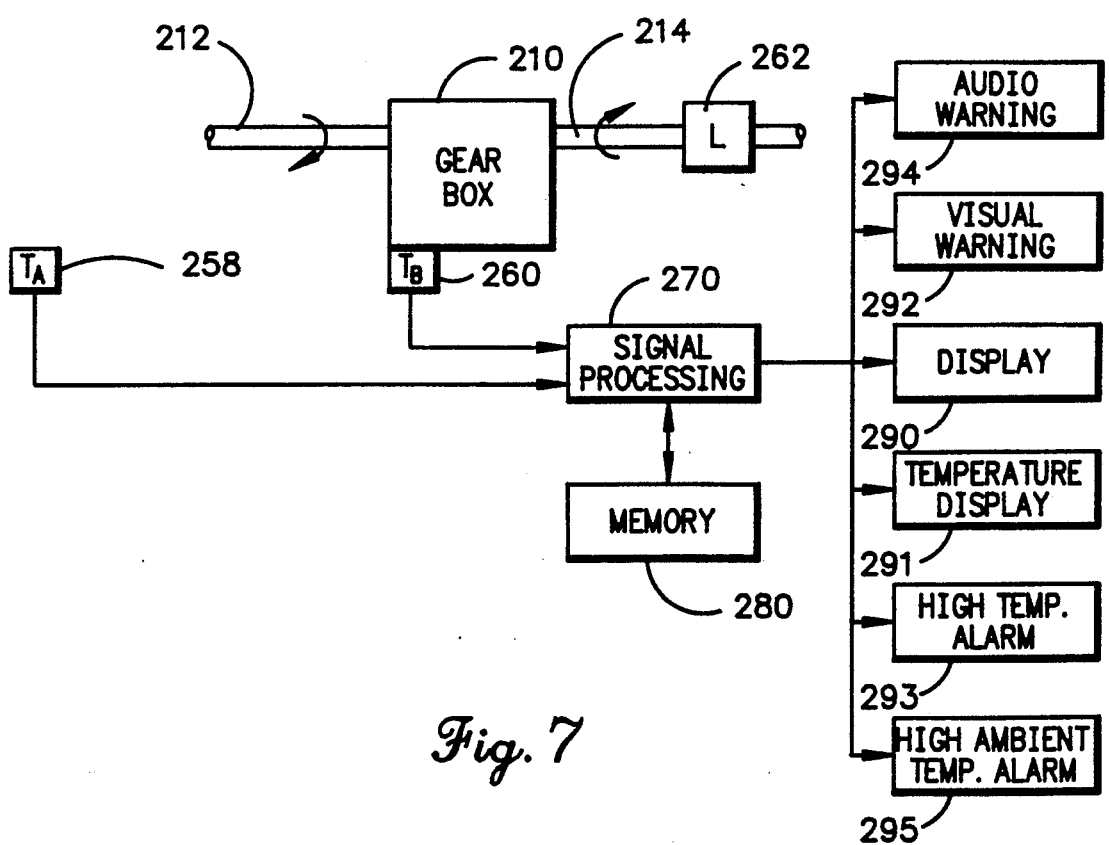
FIG. 7 is a diagram of the method according to the present invention used with a monitored gear box and showing additional measurements for purposes of implementing the present invention.

FIG. 7 showns yet another embodiment of the present invention utilized with a gear box 210. Here, gear box 210 transmits power between an input shaft 212 and an output shaft 214. The gear box waste heat temperature, $T_B$, is measured by temperature sensor 260 while ambient temperature, $T_A$, is measured by temperature sensor 258. The load on output shaft 214 is measured by a load sensor 262. Signal processor 270 receives the measured inputs of sensors 258, 260 and 262 and compares these inputs with the standard baseline profile and other stored data from memory 280. Outputs are again provided to display 290, temperature display 291, visual warning 292, high temperature alarm 293, audio warning 294 and high ambient temperature warning 295, all in the manner described with respect to the embodiment shown in FIGS. 3 and 5, above.

The ordinarily skilled person in this art will recognize, however, that the standard baseline profile, the degradation profile and the performance profile for gear box 210 shown in FIG. 7 is dependent not only upon ambient temperature but also upon the load applied to output shaft 214. Thus, the degradation profile is a two dimensional algorithm or mathematical surface. Accordingly, the standard profile, the degradation profile and the performance profile will belong to the same family of surfaces generated according to various loads and ambient temperatures. Conveniently, these profiles may be stored and generated according to a series of algorithm or as a matrix array of data points. Processor 270 should then have the capability of interpolating between the data points to arrive at an expected waste heat temperature for the system in good health as well as the fully degraded system thereby allowing calculation of the degradation indicator. It should be further realized that, for systems having additional waste heat temperature affecting variables $T_i$, the standard profile and degradation profiles may be stored in memory as an n-dimensional matrix where n equals the total number of heat affecting variables, including ambient temperature.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

We Claim:

1. A method of monitoring the health of a monitored physical system of a type that produces waste heat at a waste heat temperature ($T_B$) as a function of ambient temperature ($T_A$) and discharges such waste heat into its ambient environment to generate the degradation of the physical system's health when compared to a standardized model of the physical system in good health, wherein the physical system has a maximum rated operating temperature ($T_{MR}$) and a failure temperature ($T_F$) at which the physical system fails, the method comprising the steps of:

measuring the waste heat temperature ($T_B$) discharged by the standardized model as a function of ambient temperature ($T_A$) and developing a standard baseline profile $S(T_A)$ of the standardized model representing the physical system in good health;

storing the standard baseline profile $S(T_A)$ in a memory means for retaining information suitable for later retrieval. said memory means accessible to a microprocessor;

measuring the ambient temperature of the monitored physical system by a first sensor monitored by said microprocessor to obtain a sample ambient temperature ($T_{AS}$) at a sample time;

measuring the temperature of the waste heat of the monitored physical system by a second sensor monitored by said microprocessor at said sample time to obtain a sample waste heat temperature ($T_{BS}$);

generating an expected waste heat temperature $S(T_{AS})$ corresponding to the sample ambient temperature ($T_{AS}$) from said standard baseline profile stored in said memory means; and generating a proportionalized degradation indicator of the health of the monitored physical system by comparing in said microprocessor the sample waste heat temperature ($T_{BS}$) to the expected waste heat temperature $S(T_{AS})$ at the sample ambient temperature ($T_{AS}$).

2. The method according to claim 1 including the step of periodically updating the degradation indicator by periodically updating the sample ambient temperature ($T_{AS}$) and the sample waste heat temperature ($T_{BS}$) to generate therewith the periodically updated degradation indicator.

3. The method according to claim 2 wherein the step of periodically updating the degradation indicator is performed at time intervals at least as often as once every second.

4. A method according to claim 1 wherein said first and second sensors produce electrical signals readable by microprocessor so that the baseline profile is stored as an electrically readable memory in said memory means accessible to microprocessor whereby said microprocessor may automatically calculate the physical system degradation indicator.

5. A method according to claim 4 including the step of inhibiting the calculation of the degradation indicator of the monitored system until the waste heat temperature ($T_B$) exceeds a threshold temperature $S(T_{TA})$.

6. A method according to claim 4 including the step of displaying the degradation indicator in a visually perceivable manner.

7. A method according to claim 6 including the steps of displaying the temperature of the sample waste heat temperature ($T_{BS}$) and generating an alarm whenever the waste heat temperature $T_{BS}$ exceeds a preselected maximum temperature value.

8. A method according to claim 4 including the step of producing an audible alarm when the degradation indicator is equal to or exceeds a preselected first alarm threshold value.

9. A method according to claim 8 including the step of producing a visibly perceivable warning when the degradation indicator is equal to or exceeds a preselected second alarm threshold value less than said first alarm threshold value.

10. A method according to claim 1 including the step of producing an excess temperature alarm when the sample waste heat temperature ($T_{BS}$) equals to or exceeds a preselected maximum temperature value.

11. A method according to claim 1 including the step of generating an alarm whenever the sample ambient temperature ($T_{AS}$) is greater than the expected maximum ambient temperature ($T_{MR}$).

12. A method according to claim 1 wherein said baseline profile is stored in said memory means as an algorithm.

13. A method according to claim 1 wherein said baseline profile is stored in said memory means as a data array.

14. A method according to claim 1 wherein the waste heat produced by the physical system is a function of ambient temperature ($T_A$) and one or more additional heat affecting variable ($T_i$) and wherein the baseline profile is developed and stored as a function $S(T_A, T_i)$ of ambient temperature ($T_A$) and thee additional heat affecting variable ($T_i$), the method including the step of measuring all additional heat affecting variables at the sample time to generate the expected waste heat temperature $S(T_{AS})$ from the baseline profile.

15. A method according to claim 1 including the steps of developing a standard degradation profile $D(T_A)$ of waste heat for a physical system having a selected degree of degradation is a function of the ambient temperature ($T_A$) and storing the standard degradation profile $D(T_A)$ in said memory means and generating a degraded waste heat temperature $D(T_{AS})$ of the standard degradation profile for the sample ambient temperature ($T_{AS}$), the degradation indicator being generated according to the formula:

$$\frac{T_{BS} - S(T_{AS})}{D(T_{AS}) - S(T_{AS})} \times 100\% = D_S$$

16. A method according to claim 15 including the step of producing a warning whenever $T_{BS} \geq D(T_{AS})$.

17. A method according to claim 16 wherein the physical system has threshold operating ambient temperature ($T_{TA}$), the step of developing the standard baseline profile $S(T_A)$ for waste heat ($T_B$) is accomplished by measuring $S(T_{TA})$ and $S(T_{MR})$ and generating $S(T_A)$ as a first linear function inclusive of those data points, the step of developing the standard degradation profile is accomplished by generating $D(T_A)$ as a second linear function including the data points $D(T_M) = S(T_{TA})$ and $D(T_{MR}) = T_F$.

18. A method according to claim 17 including the step predicting the ambient temperature ($T_{AF}$) at which the monitored system would be expected to fail by constructing a monitored system profile as a third linear function $X(T_A)$ containing the points $X(T_{TA}) = S(T_{TA})$ and $S(T_{AS}) = T_{BS}$ and solving the third function for ($T_{AF}$) where $X(T_{AF}) = T_F$.

19. A method according to claim 18 including the step of displaying $T_{AF}$.

20. A method according to claim 19 including the step of producing a warning whenever $T_{AF} \leq T_{MR}$.

* * * * *